US012630786B2

(12) United States Patent
Olson et al.

(10) Patent No.: US 12,630,786 B2
(45) Date of Patent: May 19, 2026

(54) SOLID COMPOSITION COMPRISING BENZYLOXIDE, SULFONATE CARRIER, AND NON-HYGROSCOPIC ACID, AND ITS USE IN CLEANING COMPOSITIONS

(71) Applicant: ECOLAB USA INC., Saint Paul, MN (US)

(72) Inventors: Erik C. Olson, Saint Paul, MN (US); Austin Peterson, Saint Paul, MN (US); Wendy Lo, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 271 days.

(21) Appl. No.: 18/606,225

(22) Filed: Mar. 15, 2024

(65) Prior Publication Data

US 2024/0318100 A1 Sep. 26, 2024

Related U.S. Application Data

(60) Provisional application No. 63/491,981, filed on Mar. 24, 2023.

(51) Int. Cl.

| | |
|---|---|
| ***C11D 3/20*** | (2006.01) |
| ***C11D 1/00*** | (2006.01) |
| ***C11D 3/12*** | (2006.01) |
| ***C11D 3/16*** | (2006.01) |
| ***C11D 13/10*** | (2006.01) |
| ***C11D 13/20*** | (2006.01) |
| ***C11D 17/00*** | (2006.01) |
| ***C11D 17/06*** | (2006.01) |

(52) U.S. Cl.

CPC ............ *C11D 3/2082* (2013.01); *C11D 1/002* (2013.01); *C11D 3/1213* (2013.01); *C11D 3/168* (2013.01); *C11D 13/10* (2013.01); *C11D 13/20* (2013.01); *C11D 17/0047* (2013.01); *C11D 17/06* (2013.01); *C11D 2111/14* (2024.01)

(58) Field of Classification Search

CPC ............ C11D 17/0047; C11D 17/0091; C11D 17/044; C11D 17/06; C11D 2111/14; C11D 3/3418; C11D 3/33; C11D 3/2034; C11D 3/0057; C11D 3/044

See application file for complete search history.

(56) References Cited

U.S. PATENT DOCUMENTS

| | | | | |
|---|---|---|---|---|
| 4,206,069 | A | 6/1980 | Borrello | |
| 4,396,521 | A | 8/1983 | Borrello | |
| 4,615,821 | A | 10/1986 | Siklosi | |
| 4,980,271 | A | 12/1990 | Hsieh et al. | |
| 5,080,822 | A | 1/1992 | VanEenam | |
| 6,156,715 | A | 12/2000 | Lentsch et al. | |
| 6,258,765 | B1 | 7/2001 | Wei et al. | |
| 6,410,495 | B1 | 6/2002 | Lentsch et al. | |
| 6,544,942 | B1 | 4/2003 | Smith et al. | |
| 6,583,094 | B1 | 6/2003 | Lentsch et al. | |
| 6,660,707 | B2 | 12/2003 | Lentsch et al. | |
| 6,835,706 | B2 | 12/2004 | Lentsch et al. | |
| 7,341,987 | B2 | 3/2008 | Wei et al. | |
| 8,367,601 | B2 | 2/2013 | Carlson et al. | |
| 8,394,751 | B2 | 3/2013 | Hawes, III et al. | |
| 8,410,010 | B2 | 4/2013 | Reaney et al. | |
| 8,709,168 | B2 | 4/2014 | Waite et al. | |
| 8,951,956 | B2 | 2/2015 | Jones et al. | |
| 9,023,782 | B2 | 5/2015 | Peitersen et al. | |
| 10,011,808 | B2 | 7/2018 | Chan et al. | |
| 10,836,982 | B2 | 11/2020 | Vesterager | |
| 11,312,922 | B2 | 4/2022 | Bakken et al. | |
| 11,377,626 | B2 | 7/2022 | Olson et al. | |
| 11,441,107 | B2 | 9/2022 | Hammel et al. | |
| 11,518,961 | B2 | 12/2022 | Lundberg et al. | |
| 2005/0003979 | A1 | 1/2005 | Lentsch et al. | |
| 2012/0165240 | A1* | 6/2012 | Finison .................... | C11D 3/33 510/365 |
| 2012/0252713 | A1 | 10/2012 | Beatty et al. | |
| 2013/0023683 | A1 | 1/2013 | Ruwwe et al. | |
| 2019/0169550 | A1* | 6/2019 | Hunt, Jr. ................ | C11D 3/225 |
| 2019/0284505 | A1 | 9/2019 | Riehm et al. | |
| 2019/0316064 | A1 | 10/2019 | Altier et al. | |

(Continued)

FOREIGN PATENT DOCUMENTS

| | | | |
|---|---|---|---|
| EP | 0873393 | B1 | 3/2000 |
| EP | 1676904 | B1 | 12/2005 |
| WO | 0105930 | A1 | 1/2001 |

OTHER PUBLICATIONS

Benzyl oxide, Big Chemical Encyclopedia, 2019 [retrieved on Nov. 8, 2022]. Retrieved from the Internet: <URL:https://chempedia.info/info/benzyl_oxide/>, 5 pages.

CAS RN: 17158-61-1, SciFinder, Chemical Abstracts Service, 2022 [retrieved on Feb. 4, 2022]. Retrieved from the Internet: <URL:https://scifinder.cas.org>, 2 pages.

International Search Report and Written Opinion in PCT/US2024/020051, mailed Aug. 2, 2024, 20 pages.

International Search Report and Written Opinion in PCT/US2024/020054, mailed Jul. 5, 2024, 13 pages.

(Continued)

*Primary Examiner* — Charles I Boyer

(74) *Attorney, Agent, or Firm* — McKee, Voorhees & Sease, PLC

(57) ABSTRACT

Solid alkali metal benzyl oxide compositions providing flowable solids, namely flowable powders and flowable granulates, and solid compositions containing the alkali metal benzyl oxide compositions in combination with additional components are disclosed. Methods of making the solid compositions and using the solid compositions are also provided. The solid compositions are particularly useful for making solid cleaning compositions, including degreasing compositions, that beneficially are PPE-free providing safety improvements over liquid formulations.

16 Claims, 1 Drawing Sheet

(56) References Cited

U.S. PATENT DOCUMENTS

2021/0095228 A1* 4/2021 Emiru ...................... B08B 3/08

OTHER PUBLICATIONS

International Search Report and Written Opinion in PCT/US2024/020062, mailed Jul. 22, 2024, 18 pages.
International Search Report and Written Opinion in PCT/US2024/020065, mailed Jul. 16, 2024, 14 pages.

* cited by examiner

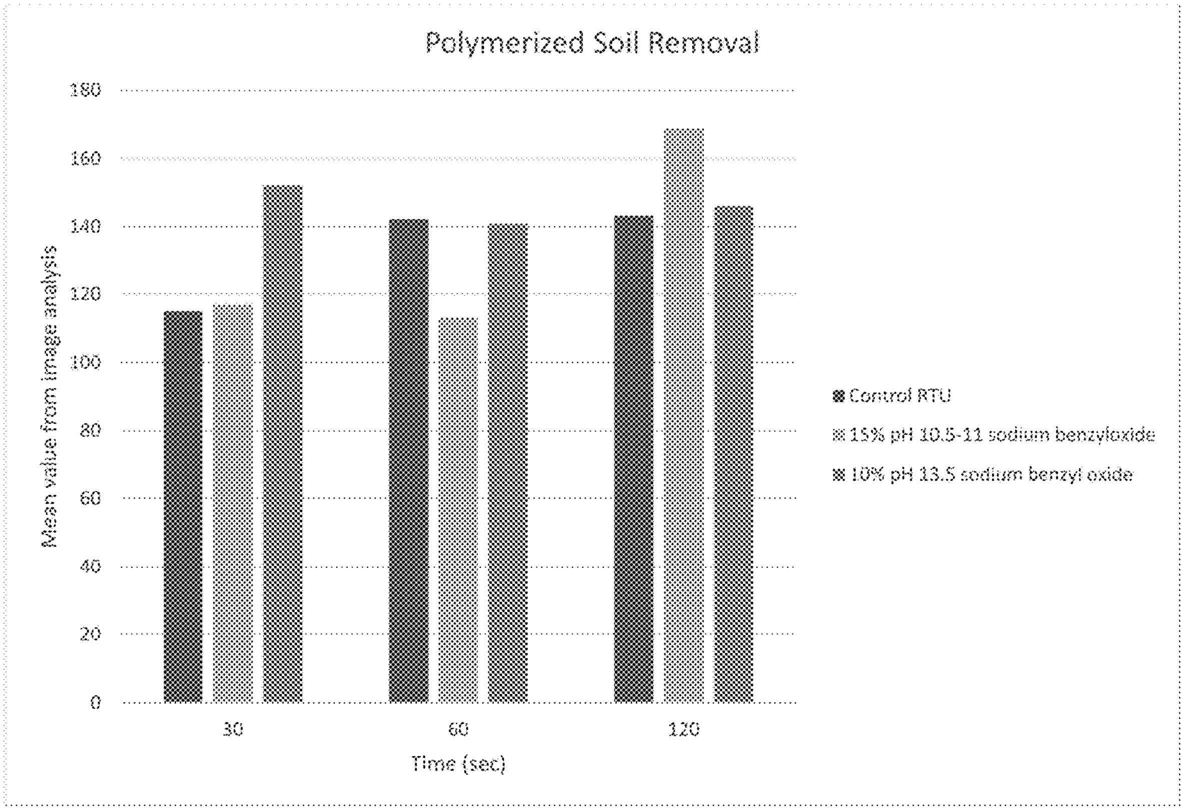
Polymerized Soil Removal
180
160
140
120
100
80
60
40
20
0
Mean value from image analysis
30
60
120
Time (sec)
Control RTU
15% pH 10.5-11 sodium benzyloxide
10% pH 13.5 sodium benzyl oxide

SOLID COMPOSITION COMPRISING BENZYLOXIDE, SULFONATE CARRIER, AND NON-HYGROSCOPIC ACID, AND ITS USE IN CLEANING COMPOSITIONS

CROSS-REFERENCE TO RELATED APPLICATIONS

This application claims priority under 35 U.S.C. § 119 to provisional application Ser. No. 63/491,981, filed Mar. 24, 2023, which is herein incorporated by reference in its entirety.

TECHNICAL FIELD

The disclosure relates generally to solid alkali metal benzyl oxide compositions and solid compositions containing the alkali metal benzyl oxide compositions in combination with additional components including a solid acid that beneficially do not require PPE for handling. Methods of making the solid compositions and using the solid compositions are also provided. The solid compositions are particularly useful for making solid cleaning compositions, including degreasing compositions, that beneficially are PPE-free providing safety improvements over liquid formulations.

BACKGROUND

Removing complex and persistent soils, such as polymerized soils, is a challenge in various industries, including for example food processing industries. Highly alkaline cleaning compositions have conventionally been required. However, in some industries the time and effort required to shut down operations to effectively clean soil surfaces has presented a significant barrier. For example, operations may require that tanks, lines, pumps and other processing equipment, be periodically cleaned. However, in some operations a significant amount of time between cleanings (as may be required by a specific production process) may take place. In other equipment, especially high, out of place piping, duct work (external as well as internal), roofs and ceilings, heating, cooling and air conditioning surfaces (HVAC), product freezers and coolers and many other surfaces in food manufacturing sites, can sometimes be left for extended periods of time without thorough cleaning, resulting in more significant challenges to remove complex and persistent soils, such as polymerized soils. In some instances, these soils can be so difficult to remove that it would is less expensive to replace equipment than to pay for the intensive labor required to clean the surfaces properly.

Therefore, an ongoing need for improved cleaning compositions and methods of use are needed that do not require major changes to equipment and food processing facility designs. Cleaning compositions and methods of use that permit extended food production time and retain a safe, clean food processing environment is desired.

Traditionally, highly alkaline and corrosive cleaning compositions are required to effectively remove complex and persistent soils, such as polymerized soils. For example, commercially available degreaser products rely upon the cleaning power of caustic or sodium hydroxide (see e.g. Easy Off™, Greasestrip Plus™) to attack polymerized grease soils. Often the pH of these cleaners is at least 12-13 or greater. In addition, the alkalinity of these cleaners is attributed to an alkali or alkaline earth metal hydroxide, for example, sodium hydroxide (NaOH) or caustic. These products are limited to liquid compositions, resulting in various undesirable attributes. Many consumers do not wish to transport and/or handle highly alkaline and corrosive compositions as this presents a variety of safety concerns and hazards. This is a result of various requirements for personnel to use personal protective equipment (PPE) to reduce employee exposure to the hazardous or corrosive materials. PPE may include, for example, goggles, eye wash stations, masks and other protective equipment.

Therefore, there exists a need to provide a solid caustic-based composition that does not require PPE for handling.

It is therefore an object of this disclosure to provide solid compositions that do not require PPE for handling.

It is a further object of the disclosure to provide methods of making and use such solid compositions.

Other objects, embodiments and advantages of this disclosure will be apparent to one skilled in the art in view of the following disclosure, the drawings, and the appended claims.

SUMMARY

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

According to an aspect of the present disclosure solid compositions comprise: an alkali metal benzyl oxide; a sulfonate carrier; and a solid acid; wherein the solid does not require PPE for handling.

According to additional aspects of the present disclosure solid compositions comprise an alkali metal benzyl oxide; a sulfonate carrier; and a non-hygroscopic solid acid; wherein the solid is tablet, block, powder or granulate, wherein the solid is a dimensionally stable solid or a flowable solid, and wherein the solid does not require personal protective equipment (PPE) for handling.

According to additional aspects of the present disclosure methods of making the solid compositions comprise: combining either (i) an alkali metal hydroxide, benzyl alcohol and a sulfonate carrier to generate in situ a solid composition, or (ii) a premix comprising alkali metal benzyl oxide and a sulfonate carrier with a solid acid, and adding a solid acid to generate the solid composition.

According to additional aspects of the present disclosure, methods of using the solid cleaning compositions comprise: generating a use solution of the cleaning compositions; and contacting a surface in need of cleaning, degreasing and/or stripping with the use solution; and removing soils from the surface, wherein the use solution pH is from about 8 to less than about 11, or about 8 to about 10.5 for non-PPE applications.

According to still further aspects of the present disclosure, solid compositions comprise: an alkali metal benzyl oxide; and a sulfonate carrier; wherein the solid is a flowable solid, including flowable powder and/or flowable granulates or a pressed solid.

According to additional aspects of the present disclosure methods of making the solid compositions comprise: combining an alkali metal hydroxide, benzyl oxide and a sulfonate carrier to generate in situ a solid composition.

According to additional aspects of the present disclosure, methods of using the solid cleaning compositions comprise: generating a use solution of the cleaning compositions; and contacting a surface in need of cleaning, degreasing and/or stripping with the use solution; and removing soils from the surface.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

BRIEF DESCRIPTION OF THE DRAWINGS

FIG. 1 shows a graph evaluating polymerized soil removal as described in Example 3 comparing sodium benzyl oxide containing solid cleaning compositions to a commercially available control degreaser formulation at equivalent and reduce pHs.

Various embodiments of the present disclosure will be described in detail with reference to the drawings, wherein like reference numerals represent like parts throughout the several views. Reference to various embodiments does not limit the scope of the disclosure. Figures represented herein are not limitations to the various embodiments according to the disclosure and are presented for exemplary illustration of the invention. An artisan of ordinary skill in the art need not view, within isolated figure(s), the near infinite number of distinct permutations of features described in the following detailed description to facilitate an understanding of the present invention.

DETAILED DESCRIPTION

The present disclosure is not to be limited to that described herein, which can vary and are understood by skilled artisans. No features shown or described are essential to permit basic operation of the present disclosure unless otherwise indicated. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6, and decimals and fractions, for example, 1.2, 3.8, 1½, and 4¾. This applies regardless of the breadth of the range.

As used herein, the term "and/or", e.g., "X and/or Y" shall be understood to mean either "X and Y" or "X or Y" and shall be taken to provide explicit support for both meanings or for either meaning, e.g. A and/or B includes the options i) A, ii) B or iii) A and B.

It is to be appreciated that certain features that are, for clarity, described herein in the context of separate embodiments, may also be provided in combination in a single embodiment. Conversely, various features that are, for brevity, described in the context of a single embodiment, may also be provided separately or in any sub-combination.

The methods and compositions of the present disclosure may comprise, consist essentially of, or consist of the components and ingredients of the present disclosure as well as other ingredients described herein. As used herein, "consisting essentially of" means that the methods, systems, apparatuses and compositions may include additional steps, components or ingredients, but only if the additional steps, components or ingredients do not materially alter the basic and novel characteristics of the claimed methods, systems, apparatuses, and compositions.

Unless defined otherwise, all technical and scientific terms used above have the same meaning as commonly understood by one of ordinary skill in the art to which embodiments of the present disclosure pertain.

The terms "invention" or "present invention" are not intended to refer to any single embodiment of the particular invention but encompass all possible embodiments as described in the specification and the claims.

The term "about," as used herein, refers to variation in the numerical quantity that can occur, for example, through typical measuring techniques and equipment, with respect to any quantifiable variable, including, but not limited to, concentration, mass, volume, time, molecular weight, temperature, pH, humidity, molar ratios, log count of bacteria or viruses, and the like. Further, given solid and liquid handling procedures used in the real world, there is certain inadvertent error and variation that is likely through differences in the manufacture, source, or purity of the ingredients used to make the compositions or carry out the methods and the like. The term "about" also encompasses these variations. Whether or not modified by the term "about," the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts. It is also sometimes indicated by a percentage in parentheses, for example, "chemical (10%)."

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated. Exemplary heterocyclic groups include, but are not limited to, aziridine, ethylene oxide (epoxides, oxiranes), thiirane (episulfides), dioxirane, azetidine, oxetane, thietane, dioxetane, dithietane, dithiete, azolidine, pyrrolidine, pyrroline, oxolane, dihydrofuran, and furan.

As used herein, the term "antimicrobial" refers to a compound or composition that reduces and/or inactivates a microbial population, including, but not limited to bacteria, viruses, fungi, and algae within about 10 minutes or less, about 8 minutes or less, about 5 minutes or less, about 3 minutes or less, about 2 minutes or less, about 1 minute or less, or about 30 seconds or less. Preferably, the term antimicrobial refers to a composition that provides at least about a 3-log, 3.5-log, 4-log, 4.5-log, or 5-log reduction of a microbial population in about 10 minutes or less, about 8 minutes or less, about 5 minutes or less, about 3 minutes or less, about 2 minutes or less, about 1 minute or less, or about 30 seconds or less.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

The term "configured" describes structure capable of performing a task or adopting a particular configuration. The term "configured" can be used interchangeably with other similar phrases, such as constructed, arranged, adapted, manufactured, and the like.

The term "corrosive," as used herein, refers to cleaning compositions in a use solution having a pH great than about 11.5 without additional evidence of non-corrosive effects. However, as one skilled in the art will ascertain, a composition having a pH below 11.5 may be considered corrosive based upon testing (e.g. animal testing to confirm toxicology of a composition). Likewise, some compositions may be considered non-corrosive with a pH above 11.5 as a result of test data or consideration of buffering capacities (i.e. acid/alkali reserve). Classifications and testing for "corrosive" formulations are based upon corrosive or irritant effects of a substance and/or formulation. Further description of testing requirements (including either animal or human data) is available from various regulatory agencies at the time of the disclosure, including for example European Commission, Enterprise and Industry Directorate-General, Position Paper of DG ENTR/G2 on the Classification and Labeling of Preparations with Extreme pH Values (11.5<pH<2) (2007).

According to embodiments the solid compositions are non-corrosive as a solid composition combining the alkali metal benzyl oxide, sulfonate carrier and a solid acid. Beneficially, the solid compositions are non-corrosive and do not require personal protective equipment (PPE) for handling, whereas the flowable solids containing the alkali metal benzyl oxide and sulfonate carrier have a pH that requires use of PPE, e.g. pH between about 13-14.

As used herein, the term "exemplary" refers to an example, an instance, or an illustration, and does not indicate a most preferred embodiment unless otherwise stated.

As used herein, the phrase "flowable solid" refers to powders or granulates that do not stick together when moved or transported making them easy to move and pour. The flowable solids can include particles that generally have a size less than about 100 μm as well as granulates that are larger in size, often up to 1000 μm or larger.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "generally" encompasses both "about" and "substantially."

The term "hard surface" refers to a solid, substantially non-flexible surface such as a counter top, tile, floor, wall, panel, window, plumbing fixture, kitchen and bathroom furniture, appliance, engine, circuit board, dish, mirror, window, monitor, touch screen, and thermostat. Hard surfaces are not limited by the material; for example, a hard surface can be glass, metal, tile, vinyl, linoleum, composite, wood, plastic, etc. Hard surfaces may include for example, health care surfaces and food processing surfaces.

As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein the term "polymer" refers to a molecular complex comprised of a more than ten monomeric units and generally includes, but is not limited to, homopolymers, copolymers, such as for example, block, graft, random and alternating copolymers, terpolymers, and higher "x"mers, further including their analogs, derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to any soil, including, but not limited to, non-polar oily and/or hydrophobic substances which may or may not contain particulate matter such as industrial soils, mineral clays, sand, natural mineral matter, carbon black, graphite, kaolin, environmental dust, and/or food based soils such as blood, proteinaceous soils, starchy soils, fatty soils, cellulosic soils, etc.

The "scope" of the present disclosure is defined by the appended claims, along with the full scope of equivalents to which such claims are entitled. The scope of the disclosure is further qualified as including any possible modification to any of the aspects and/or embodiments disclosed herein which would result in other embodiments, combinations, subcombinations, or the like that would be obvious to those skilled in the art.

The term "substantially" refers to a great or significant extent. "Substantially" can thus refer to a plurality, majority, and/or a supermajority of said quantifiable variable, given proper context.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both, when using the substitute cleaning product or substitute cleaning system rather than a corrosive, greater pH cleaning composition to address a typical soiling condition on a typical substrate as described herein. This degree of cleanliness may, depending on the particular cleaning product and particular substrate, correspond to a general absence of visible soils, or to some lesser degree of cleanliness.

The term "surfactant" or "surface active agent" refers to an organic chemical that when added to a liquid changes the properties of that liquid at a surface.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions include but are not limited to, those that include polypropylene polymers (PP), polycarbonate polymers (PC), melamine formaldehyde resins or melamine resin (melamine), acrylonitrile-butadiene-styrene polymers (ABS), and polysulfone polymers (PS). Other exemplary plastics that can be cleaned using the compounds and compositions of the disclosure include polyethylene terephthalate (PET) polystyrene polyamide.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

Solid Compositions

According to embodiments, the solid compositions provide a beneficially alternative to liquid formulations while also providing non-PPE formulations. The solid compositions include an alkali metal benzyl oxide and a sulfonate carrier. The solid compositions can also include an alkali metal benzyl oxide, a sulfonate cater, and a solid acid. The solid compositions can still further include additional functional ingredients. Exemplary solid compositions are shown in Tables 1-3 in weight percentage. While the components may have a percent actives of 100%, it is noted that Tables 1-3 do not recite the percent actives of the components, but rather, recites the total weight percentage of the raw materials (i.e. active concentration plus inert ingredients).

TABLE 1

Solid Composition

| Material | First Exemplary Range wt-% | Second Exemplary Range wt-% | Third Exemplary Range wt-% |
|---|---|---|---|
| Alkali metal benzyl oxide | 40-80 | 50-70 | 55-65 |
| Sulfonate | 20-60 | 30-50 | 35-45 |
| Additional Functional Ingredients | 0-20 | 0-15 | 0-10 |

TABLE 2

Solid Cleaning Composition

| Material | First Exemplary Range wt-% | Second Exemplary Range wt-% | Third Exemplary Range wt-% |
|---|---|---|---|
| Alkali metal benzyl oxide | 10-80 | 10-60 | 30-60 |
| Sulfonate | 5-40 | 10-40 | 20-40 |
| Solid acid | 20-60 | 30-50 | 35-45 |
| Additional Functional Ingredients | 0-50 | 0-40 | 0-20 |

TABLE 3

Solid Cleaning Composition with Premix

| Material | First Exemplary Range wt-% | Second Exemplary Range wt-% | Third Exemplary Range wt-% |
|---|---|---|---|
| Premix (Alkali metal benzyl oxide and sulfonate) | 30-80 | 40-80 | 50-70 |
| Solid acid | 20-70 | 20-60 | 30-50 |
| Additional Functional Ingredients | 0-50 | 0-40 | 0-20 |

Alkali Metal Benzyl Oxide

The solid compositions and solid cleaning compositions comprises an alkali metal benzyl oxide. The alkali metal benzyl oxide is a solid and preferably is sodium benzyl oxide. In embodiments, the alkali metal benzyl oxide is substantially free of water. In further embodiments, the alkali metal benzyl oxide is free of water.

In some embodiments, the alkali metal benzyl oxide is included in the solid composition at an amount of at least about 40 wt-% to about 80 wt-%, about 50 wt-% to about 70 wt-%, or about 55 wt-% to about 65 wt-%. In addition, without being limited according to the disclosure, all ranges recited are inclusive of the numbers defining the range and include each integer within the defined range.

In additional embodiments, the alkali metal benzyl oxide is included in the solid cleaning composition at an amount of at least about 10 wt-% to about 80 wt-%, about 25 wt-% to about 70 wt-%, about 30 wt-% to about 70 wt-%, about 30 wt-% to about 60 wt-%, or about 30 wt-% to about 50 wt-%. In additional embodiments, the alkali metal benzyl oxide is included in the solid cleaning composition at an amount of at least about 10 wt-% to about 60 wt-%, about 20 wt-% to about 50 wt-%. In addition, without being limited according to the disclosure, all ranges recited are inclusive of the numbers defining the range and include each integer within the defined range.

In additional embodiments, the alkali metal benzyl oxide and the sulfonate carrier can be combined in a premix composition in a combined amount of at least about 30 wt-% to about 80 wt-%, about 40 wt-% to about 80 wt-%, or about 50 wt-% to about 70 wt-%. In addition, without being limited according to the disclosure, all ranges recited are inclusive of the numbers defining the range and include each integer within the defined range.

Sulfonate

The solid compositions and solid cleaning compositions comprises a sulfonate carrier comprising a C1-C18 sulfonate, or a short chain alkyl benzene or alkyl naphthalene hydrotrope. The class of C1-C18 sulfonates and short chain alkyl benzene or alkyl naphthalene hydrotropes are anionic hydrotropes and include alkyl benzene sulfonates based on toluene, xylene, and cumene, and alkyl naphthalene sulfonates. In embodiments, the hydrotropes are short chain alkyl benzene or alkyl naphthalene hydrotrope that are C1-C12, C1-C8, or C1-C4 alkyl benzene or alkyl naphthalene hydrotrope.

In embodiments, the hydrotropes are alkyl sulfonates, including linear and branched primary and secondary alkyl sulfonates, aromatic sulfonates with or without substituents, or sulfonated carboxylic acid esters. In embodiments, the alkyl sulfonates C1-C18 sulfonates including, for example alpha-olefin sulfonates (AOS).

Exemplary sulfonate carriers include, for example, sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butyl naphthalene sulfonate. In a preferred embodiment the carrier is sodium xylene sulfonate.

Beneficially, the sulfonate carrier aids in the solidification of the solid compositions and the solid cleaning compositions and further hydrotropes the benzyl alcohol in solution at a point of use once the solid composition or solid cleaning composition is dissolved. Beneficially, in still further embodiments the sulfonate carrier aids in the solidification of the solid compositions and the solid cleaning compositions and further acts as a hydrotrope in solution at a point of use to solubilize hydrophobic compounds, such as soils.

In some embodiments, the sulfonate carrier is included in the solid composition at an amount of at least about 20 wt-% to about 60 wt-%, about 30 wt-% to about 50 wt-%, or about 35 wt-% to about 45 wt-%. In addition, without being limited according to the disclosure, all ranges recited are inclusive of the numbers defining the range and include each integer within the defined range.

In additional embodiments, the sulfonate carrier is included in the solid cleaning composition at an amount of at least about 5 wt-% to about 40 wt-%, about 10 wt-% to about 40 wt-%, about 20 wt-% to about 40 wt-%, or about 20 wt-% to about 35 wt-%. In addition, without being limited according to the disclosure, all ranges recited are inclusive of the numbers defining the range and include each integer within the defined range.

In additional embodiments, the sulfonate carrier and the alkali metal benzyl oxide can be combined in a premix composition in a combined amount of at least about 30 wt-% to about 80 wt-%, about 40 wt-% to about 80 wt-%, or about 50 wt-% to about 70 wt-%. In addition, without being limited according to the disclosure, all ranges recited are inclusive of the numbers defining the range and include each integer within the defined range.

Solid Acid

The solid compositions comprise a solid acid to provide a solid composition providing a desired PPE-free use solution pH. In embodiments, the solid acid is a non-hydroscopic acid. Preferred solid acids comprise acid ethylenediaminetetraacetic acid (EDTA) and/or glutamic acid. These preferred solid non-hydroscopic acids provide benefits over other non-hydroscopic acids including sulfamic acid, citric acid, bisulfate, adipic acid, succinic acid, and tartaric acid.

In some embodiments a combination of solid non-hydroscopic acids are used in the solid compositions including at least one of acid ethylenediaminetetraacetic acid (EDTA) and/or glutamic acid and an additional solid non-hydroscopic acid, such as one selected from the group consisting of sulfamic acid, citric acid, bisulfate, adipic acid, succinic acid, and tartaric acid. In further embodiments a combination of solid acids are used in the solid compositions including at least one of acid ethylenediaminetetraacetic acid (EDTA) and/or glutamic acid and an additional solid acid.

In additional embodiments, the solid acid is included in the solid cleaning composition at an amount of at least about 20 wt-% to about 60 wt-%, about 30 wt-% to about 60 wt-%, about 30 wt-% to about 50 wt-%, or about 35 wt-% to about 45 wt-%. In addition, without being limited according to the disclosure, all ranges recited are inclusive of the numbers defining the range and include each integer within the defined range.

Additional Functional Ingredients

The components of the solid cleaning composition can further be combined with various functional components suitable for uses disclosed herein. In some embodiments, the solid cleaning compositions including the alkali metal benzyl oxide, sulfonate carrier, and solid acid can make up a large amount, or even substantially all of the total weight of the solid cleaning compositions. For example, in some embodiments few or no additional functional ingredients are disposed therein.

In other embodiments, additional functional ingredients may be included in the solid cleaning compositions. The functional ingredients provide desired properties and functionalities to the compositions. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning. However, other embodiments may include functional ingredients for use in other applications.

In some embodiments, the solid cleaning compositions may include surfactants, polymers, optical brighteners, defoaming agents, anti-redeposition agents, bleaching agents, solubility modifiers, dispersants, metal protecting agents, corrosion inhibitors, soil antiredeposition agents, stabilizing agents, corrosion inhibitors, chelants enzymes, aesthetic enhancing agents including fragrances and/or dyes, rheology and/or solubility modifiers, hydrotropes or couplers, buffers, additional solvents, additional cleaning agents and the like.

According to embodiments of the disclosure, the various additional functional ingredients may be provided in the solid cleaning compositions in the amount from about 0 wt-% and about 50 wt-%, from about 0 wt-% and about 40 wt-%, from about 0 wt-% and about 30 wt-%, from about 0.01 wt-% and about 20 wt-%, from about 0.1 wt-% and about 20 wt-%, or from about 1 wt-% and about 20 wt-%. In addition, without being limited according to the disclosure, all ranges recited are inclusive of the numbers defining the range and include each integer within the defined range.

According to embodiments of the disclosure, the various additional functional ingredients, such as for example processing aids, may be provided in the solid compositions in the amount from about 0 wt-% and about 20 wt-%, from about 0 wt-% and about 15 wt-%, from about 0 wt-% and about 10 wt-%, from about 0.01 wt-% and about 10 wt-%, from about 0.1 wt-% and about 10 wt-%, or from about 1 wt-% and about 10 wt-%. In addition, without being limited according to the disclosure, all ranges recited are inclusive of the numbers defining the range and include each integer within the defined range.

Methods of Making

The solid compositions are made by combining an alkali metal hydroxide, benzyl alcohol and a sulfonate carrier to generate in situ a solid composition. The solid cleaning compositions are made by combining an alkali metal hydroxide, benzyl alcohol and a sulfonate carrier to generate in situ a solid composition, and thereafter adding a solid acid to generate the solid composition. In some embodiments a premix of a preformed alkali metal benzyl oxide and sulfonate carrier can be combined with the solid acid to provide a solid composition. In further embodiments one or more additional functional ingredients can be combined with the solid compositions or included in the reagents for the in situ reaction to form the solid composition.

The solid compositions provide a stable, flowable powder or granulate by combining the alkali metal hydroxide, benzyl alcohol and a sulfonate carrier. A solid acid is further included to bring the pH of the solid composition to a non-PPE level. The solid acid is not required to make a stable solid as the powder and/or granulates are stable as described herein.

The combining step can be an addition of materials and mixing thereof. For example, a solid composition or solid cleaning composition is formed by mixing the reagents and forming a contiguous one phase homogenous solid.

Compositions can be produced using a batch or continuous mixing system. In an exemplary embodiment, a single- or twin-screw extruder is used to combine and mix one or more agents at high shear to form a homogeneous mixture.

Specifically, in a forming process, the liquid and/or solid components are introduced into the mixing system and are continuously mixed until the components form a contiguous solid. In an exemplary embodiment, the components are mixed in the mixing system for at least approximately 5 seconds, 15 seconds, 30 seconds, 60 seconds, 5 minutes, 10 minutes, 30 minutes, 60 minutes. The mixture is then discharged from the mixing system and can be subject to further processing, such as for powders.

In an exemplary embodiment, the formed composition begins to harden to a solid form near instantaneously during the drying process to provide a solid powder or granulate. During the drying process the particle size of the powder or granulate increases over the course of processing from a minute minutes to a few hours, e.g. about 2 hours. The increased powder size provides a flowable powder. The increased granulate size provides a flowable granulate.

In embodiments, the molar ratio of the alkali metal hydroxide to the benzyl alcohol reacted with the sulfonate carrier is at least about 1:1 to generate a solid composition, wherein the solid is a flowable solid. In embodiments, the ratio of the alkali metal hydroxide to the benzyl alcohol is at least about 1:1, at least about 2:1, at least about 1:1 to about 5:1, at least about 2:1 to about 5:1, at least about 2:1 to about 4:1, or about 1 4:1. As described herein, the ratio of alkali metal hydroxide to the benzyl alcohol can be as low as about 1:1 with the inclusion of the sulfonate carrier and/or other stabilizing or solidifying components included in the compositions.

In embodiments, the alkali metal hydroxide is added in an amount between about 10 wt-% and about 50 wt-%, the benzyl alcohol is added in an amount between about 1 wt-% and about 30 wt-%, and the sulfonate carrier is added in an amount between about 30 wt-% and about 60 wt-%. Thereafter the acid is added or in alternative embodiments the acid is added with the initial reagents to form the solid composition.

In further embodiments, the alkali metal benzyl oxide and sulfonate premix is added in an amount between about 40 wt-% and about 80 wt-% and the acid is added in an amount between about 20 wt-% and about 60 wt-%.

In embodiments, the molar ratio of alkali metal hydroxide to benzyl alcohol is at least about 1:1, at least about 2:1, or preferably from about 2:1 to about 5:1, or from about 2:1 to about 4:1 to generate the solid composition, and for the first step the alkali metal hydroxide is added in an amount between about 10 wt-% and about 50 wt-%, the benzyl alcohol is added in an amount between about 1 wt-% and about 30 wt-%, and the sulfonate carrier is added in an amount between about 30 wt-% and about 60 wt-%.

The reagents are combined to provide a solid composition having various sizes or shapes, the scope of the disclosure is not limited according to unit dose sizing (or packaging) or larger, multiuse solid sizes (or packaging). Solids can include a tablet, block, or powder. In embodiments the solid is dimensionally stable. In embodiments the powder is a flowable powder. In embodiments the granulate is a flowable granulate.

In embodiments the solid composition which consists of the alkali metal benzyl oxide, in some embodiments remaining hydrogen peroxide, and the sulfonate carrier is substantially free of water, or free of water. In embodiments the solid composition which consists of the alkali metal benzyl oxide, in some embodiments remaining hydrogen peroxide, the sulfonate carrier and the solid acid and is substantially free of water, or free of water.

The methods can further comprise a spray drying step and/or granulation step, including for example fluid bed drying. Spray drying is typically a one step process where a liquid is dried with hot gas and the resulting particles are often finer and do not have the opportunity to agglomerate or grow in size before reaching the product outlet.

In some embodiments where larger particles are desired, a fluid bed can be integrated into the process. In fluid bed drying, a liquid is dried with hot gas and the resulting particles have the opportunity to recirculate through the spray zone enabling agglomeration or layered growth of the particles to a desired size. Particles of these sizes are often referred to as granulates. Granulation is a broader term where through various methods or pieces of equipment, a finer powder is grown into granulates. Fluid bed granulation is a type of granulation.

In an embodiment, the dried material is a powder or granule form of the solid. This beneficially provides a dust-free, free-flowing granule or powder. In an embodiment, the solid composition or solid cleaning composition can be completed in an aqueous solution and then dried (e.g. through spray drying, fluid bed dryer, or granulation) to further concentrate the benzyl oxide solids in powder or granulate form.

Alkali Metal Hydroxide Source

An alkali metal hydroxide is a reagent to form the solid compositions and solid cleaning compositions. Exemplary alkali metal hydroxides include sodium hydroxide, potassium hydroxide, and lithium hydroxide or mixtures thereof, and most preferred is sodium hydroxide. The alkali metal hydroxide can include one or more of liquid alkali metal hydroxide and solid alkali metal (e.g. caustic beads). The alkali metal hydroxide is preferably a liquid and can include from about 20-74% (actives basis) alkali metal hydroxide liquid.

In some embodiments the solid compositions and the solid cleaning compositions include remaining or excess alkali metal hydroxide that is unreacted depend on the molar ratio of benzyl alcohol to hydroxide employed. In preferred embodiments, the remaining or excess alkali metal hydroxide drives the formation of the alkali metal benzyloxide.

In some embodiments the calculated molar ratio of benzyl oxide to remaining sodium hydroxide can be calculated (assuming 100% conversion of benzyl alcohol to benzyloxide) based on the ratio of alkali metal hydroxide to benzyl alcohol that is at least about 1:1, at least about 2:1, or preferably from about 2:1 to about 5:1, or from about 2:1 to about 4:1 to form the solid composition. The calculated amount of remaining sodium hydroxide is the preferred route as analytical methods are unable to confirm in solid form due to the benzyl oxide reverting to benzyl alcohol when in solution.

In some embodiments, the alkali metal hydroxide is combined with the benzyl alcohol and sulfonate carrier in an amount from about 5 wt-% to about 60 wt-%, about 10 wt-% to about 50 wt-%, or about 20 wt-% to about 40 wt-% to generate in situ the solid composition. In addition, without being limited according to the disclosure, all ranges recited are inclusive of the numbers defining the range and include each integer within the defined range.

Benzyl Alcohol

Benzyl alcohol is a reagent to form the solid compositions and solid cleaning compositions. Benzyl alcohol is an aromatic alcohol and in some embodiments alternative solvents could be employed. Exemplary solvents and solvent systems may include one or more different solvents including aromatic alcohols, such as methyl benzyl alcohol, benzyloxy ethanol, or other phenol alcohols. The benzyl alcohol is preferred to combine with the alkali metal hydroxide to form benzyl oxide.

In some embodiments, the benzyl alcohol is combined with the alkali metal hydroxide and sulfonate carrier in an amount from about 1 wt-% to about 30 wt-%, about 10 wt-% to about 30 wt-%, or about 20 wt-% to about 30 wt-% to generate in situ the solid composition. In addition, without being limited according to the disclosure, all ranges recited are inclusive of the numbers defining the range and include each integer within the defined range.

Sulfonate Carrier

The sulfonate carrier is combined with the alkali metal hydroxide and benzyl alcohol in an amount from about 20 wt-% to about 80 wt-%, about 30 wt-% to about 60 wt-%, or about 40 wt-% to about 60 wt-% to generate in situ the solid composition. In addition, without being limited according to the disclosure, all ranges recited are inclusive of the numbers defining the range and include each integer within the defined range.

Methods of Use

The methods of using the solid cleaning compositions are suitable for cleaning, degreasing, and/or stripping a number of soiled surfaces and/or articles. In certain embodiments, environmental cleaning methods are provided where a surface and/or article is cleaned, degreased and/or stripped. In other embodiments, any cleaning application in need of a non-corrosive composition and/or a composition that does not require use of PPE by a user is provided.

Exemplary industries in which the present methods can be used include, but are not limited to: food service industry; food and beverage industry; consumer degreasing applications; oil processing industry; industrial agriculture and ethanol processing; and the pharmaceutical manufacturing industry. Suitable use for the compositions and methods described herein may include, for example, cleaning various environmental surfaces. Suitable use for the compositions and methods described herein may include cleaning hard surfaces.

Hard surfaces can include various metal surfaces. Beneficially in some embodiments the lower pH of the use compositions are non-corrosive and can be used on various surfaces. In an embodiment the compositions can be used as non-corrosive degreaser composition (concentrate and use solution) that are non-aluminum corrosive compositions (i.e. not corrosive to aluminum a more sensitive metal surface). Such benefits can be demonstrates, for example, by not etching or otherwise damaging the surface, including through less (compared to a control) or no aluminum mass loss with application.

The compositions and methods can be used as an oven cleaner, including microwave ovens, general degreaser, fryer degreaser, smokehouse cleaner, floor cleaner, exhaust hood cleaner, drain cleaner, floor finish remover, floor cleaner, wall cleaner, fryer cleaner, pot and pan cleaner (and other dishes, flatware, etc.), carpet spotter, pharmaceutical and cosmetics cleaner, instrument cleaner, tar remover, and the like.

In an embodiment, the methods are particularly suitable for cleaning and degreasing challenging soils, such as polymerized fat soils. The methods can also be used to remove soils other than polymerized soils, including for example, starch, cellulosic fiber, protein, simple carbohydrates and combinations of any of these soil types with mineral complexes. Examples of specific food soils that are effectively removed using the present methods include, but are not limited to, soils generated in the manufacture and processing meat, poultry, vegetables and fruit, bakery goods, soft drinks, brewing and fermentation residues, soils generated in sugar beet and cane processing and processed foods containing these ingredients and associated ingredients such as juices, sauces and condiments. These soils can develop on environmental surfaces such as walls and floors, freezers and cooling systems, heat exchange equipment surfaces, conveyor surfaces and on other surfaces during the manufacturing and packaging process.

The methods of using the solid cleaning compositions include first generating a use solution. In embodiment the dilution range for forming a use solution from the solid cleaning composition is from about 1% to about 20%, from about 5% to about 20%, or about 10% to about 15%.

The solid cleaning compositions can be applied at a use or concentrate solution having a pH between about 8 to about 11.5, or between about 8 to about 11, or preferably between about 8 to about 10.5. Without being limited to rate of dilution of the solid cleaning composition, the generation of a use solution of the solid cleaning compositions beneficially provides a use solution pH for non-PPE applications.

According to preferred embodiments, the compositions having a pH below about 11.5 do not require PPE, while unexpectedly providing the same or substantially similar cleaning, degreasing, and/or stripping efficacy as compositions having pH above about 11.5 and/or compositions including caustic. In other aspects, the compositions provide superior cleaning, degreasing, and/or stripping efficacy. In other aspects, the compositions provide the efficacious cleaning, degreasing, and/or stripping efficacy without damaging the treated surfaces, including sensitive metals such as aluminum.

Thereafter a use solution is generated, the use solution contacts a surface or article for a suitable amount of time to treat the surface and/or article. In some embodiments the use solution of the solid cleaning compositions is in contact with a surface or article for a sufficient amount of time to clean the surface or article. In an aspect, the surface or article is contacted with the use solution of the cleaning composition for at least about 1 second, at least about 1 minute, at least about 10 minutes, or at least about 1 hour. In some embodiments the surface or article is contacted between about 1 second to about 24 hours, or between about 1 minute to about 2 hours. The soils are then removed from the surface.

The use solution of the cleaning compositions can be applied at a use or concentrate solution to a surface or article in need of cleaning. In an aspect, a use concentration of the solid cleaning composition includes from about 100 ppm to about 150,000 ppm, from about 500 ppm to about 100,000 ppm, from about 1,000 ppm to about 100,000 ppm, or from about 5,000 ppm to about 10,000 ppm, including all ranges therebetween.

Beneficially the methods of employing the solid cleaning composition do not require use of PPE as a result of the pH below about 11.5.

In an embodiment the application of the use solution of the solid cleaning composition does not require substantial mechanical action or excessive temperatures. In some embodiments, no additional mechanical force is used for removal of the soils. In embodiments, the methods of use described herein provide at least substantially similar cleaning efficacy to that obtained with the use of corrosive, highly alkaline compositions of the prior art. In additional embodiments, the methods of use described herein provide superior soil removal in comparison to traditional corrosive compositions having pH greater than about 11.5.

EMBODIMENTS

The present disclosure is further defined by the following numbered paragraphs:

[Paragraph 1] A solid composition comprising: an alkali metal benzyl oxide; a sulfonate carrier; and a non-hygroscopic solid acid; wherein the solid does not require personal protective equipment (PPE) for handling.

The solid composition of paragraph 1, wherein the alkali metal benzyl oxide comprises sodium benzyl oxide.

The solid composition of any one of paragraphs 1-2, wherein the sulfonate carrier is a short chain alkyl benzene or alkyl naphthalene hydrotrope.

The solid composition of any one of paragraphs 1-3, wherein the sulfonate carrier comprises one or more of sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butyl naphthalene sulfonate.

The solid composition of any one of paragraphs 1-4, wherein the non-hydroscopic solid acid is an acid EDTA and/or glutamic acid.

The solid composition of paragraph 5, wherein the non-hydroscopic solid acid is acid is further combined with an additional solid acid, preferably an additional non-hygroscopic solid acid.

The solid composition of any one of paragraphs 1-6, wherein: (a) the alkali metal benzyl oxide comprises from about 10-60 wt-% of the composition, the sulfonate carrier comprises from about 5-40 wt-% of the composition, and the non-hygroscopic solid acid comprises from about 20-60 wt-% of the composition; (b) the alkali metal benzyl oxide comprises from about 20-50 wt-% of the composition, the sulfonate carrier comprises from about 10-30 wt-% of the composition, and the non-hygroscopic solid acid comprises from about 25-50 wt-% of the composition, (c) the alkali metal benzyl oxide and the sulfonate carrier are provided in a premix comprising from about 40-80 wt-% of the composition, and the non-hygroscopic solid acid comprises from about 20-60 wt-% of the composition, or (d) the alkali metal benzyl oxide and the sulfonate carrier are provided in a premix comprising from about 50-70 wt-% of the composition, and the non-hygroscopic solid acid comprises from about 30-50 wt-% of the composition.

The solid composition of any one of paragraphs 1-7, wherein the solid is tablet, block, or powder, and wherein the solid is a dimensionally stable solid or a flowable solid.

The solid composition of any one of paragraphs 1-8, wherein the solid consists of the alkali metal benzyl oxide, optionally alkali metal hydroxide, the sulfonate carrier and the non-hygroscopic solid acid and is substantially free of water, or free of water.

The solid composition of any one of paragraphs 1-9, further comprising at least one additional functional ingredient suitable for a solid cleaning and/or degreasing composition.

[Paragraph 11] A method of making a solid composition comprising: combining either (i) an alkali metal hydroxide, benzyl alcohol and a sulfonate carrier to generate in situ a solid composition, or (ii) a premix comprising alkali metal benzyl oxide and a sulfonate carrier with a non-hygroscopic solid acid, wherein the molar ratio of alkali metal hydroxide to benzyl alcohol is at least about 2:1 to about 5:1, or preferably from about 2:1: to about 4:1, and adding a non-hygroscopic solid acid to generate the solid composition.

The method of paragraph 11, wherein for the first step the alkali metal hydroxide is added in an amount between about 10 wt-% and about 50 wt-%, the benzyl alcohol is added in an amount between about 1 wt-% and about 30 wt-%, and the sulfonate carrier is added in an amount between about 30 wt-% and about 60 wt-%.

The method of paragraph 12, wherein the alkali metal hydroxide comprises one or more of liquid alkali metal hydroxide and solid alkali metal (e.g. caustic beads), and optionally wherein the alkali metal hydroxide comprises a 20-74% (actives basis) alkali metal hydroxide liquid.

The method of any one of paragraphs 11-13, wherein the solid is tablet, block, powder, or granulate and wherein the solid is a dimensionally stable solid or a flowable solid.

The method of any one of paragraphs 11-14, further comprising a spray drying step and/or granulation step.

[Paragraph 16] A method of using a solid cleaning composition comprising: generating a use solution of the cleaning composition according to any one of paragraphs 1-10 or the composition made by the methods of any one of paragraphs 11-15; and contacting a surface or article in need of cleaning, degreasing and/or stripping with the use solution; and removing soils from the surface, wherein the use solution pH is from about 8 to less than about 11, or preferably about 8 to about 10.5 for non-personal protective equipment (PPE) applications.

The method of paragraph 16, wherein the surface is a hard surface or article.

The method of any one of paragraphs 16-17, wherein the dilution range of the use solution is from about 5-20%, or about 10-15%.

The method of any one of paragraphs 16-18, wherein the surface or article is soiled with a polymerized fat soil.

The method of any one of paragraphs 16-19, wherein the contacting of the surface is for an amount of time from about one second to about 24 hours.

The method of any one of paragraphs 16-19, wherein the contacting of the surface is for an amount of time from about one minute to about 2 hours.

The method of any one of paragraphs 16-21, wherein no additional mechanical force is required for removal of the soil.

[Paragraph 23] A solid composition comprising: an alkali metal benzyl oxide; and a sulfonate carrier, wherein the solid is a flowable powder or flowable granulate or a pressed solid.

The solid composition of paragraph 23, comprising from about 40 wt-% to about 80 wt-% of the alkali metal benzyl oxide comprising sodium benzyl oxide.

The solid composition of any one of paragraphs 23-24, comprising from about 20 wt-% to about 60 wt-% of the sulfonate carrier is a short chain alkyl benzene or alkyl naphthalene hydrotrope.

The solid composition of any one of paragraphs 23-25, wherein the sulfonate carrier comprising one or more of sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butyl naphthalene sulfonate.

The solid composition of any one of paragraphs 23-26, wherein the solid composition is substantially free of water, or free of water, and optionally further comprises an alkali metal hydroxide.

[Paragraph 28] A method of making a solid composition comprising: combining an alkali metal hydroxide, benzyl alcohol and a sulfonate carrier to generate in situ a solid composition, wherein the molar ratio of alkali metal hydroxide to benzyl alcohol is at least about 2:1 to about 5:1, or preferably from about 2:1: to about 4:1.

The method of paragraph 28, wherein the alkali metal hydroxide comprises one or more of liquid alkali metal hydroxide and solid alkali metal (e.g. caustic beads), and optionally wherein the alkali metal hydroxide comprises a 20-74% (actives basis) alkali metal hydroxide liquid.

The method of any one of paragraphs 28-29, wherein the solid is flowable powder or flowable granulate.

The method of any one of paragraphs 28-30, further comprising adding a solid acid to provide a pH at a non-PPE level.

The method of any one of paragraphs 29-31, further comprising a spray drying step and/or granulation step.

The method of any one of paragraphs 28-32, further comprising pressing the flowable powder or flowable granulate into a solid.

[Paragraph 34] A method of using a solid cleaning composition comprising: generating a use solution of the cleaning composition according to any one of paragraphs 23-27 or the composition made by the method of any one of paragraphs 28-33; and contacting a surface or article in need of cleaning, degreasing and/or stripping with the use solution; and removing soils from the surface.

The method of paragraph 34, wherein the surface is a hard surface or article soiled with a polymerized fat soil.

The method of any one of paragraphs 34-35, wherein the dilution range of the use solution is from about 5-20%, or about 10-15%.

The method of any one of paragraphs 34-36, wherein the contacting of the surface is for an amount of time from about one second to about 24 hours, or from about one minute to about 2 hours.

The method of any one of paragraphs 34-37, wherein no additional mechanical force is required for removal of the soil.

EXAMPLES

Embodiments of the present disclosure are further defined in the following non-limiting Examples. It should be understood that these Examples, while indicating certain embodiments of the disclosure, are given by way of illustration only. From the above discussion and these Examples, one skilled in the art can ascertain the essential characteristics of this disclosure, and without departing from the spirit and scope thereof, can make various changes and modifications of the embodiments of the disclosure to adapt it to various usages and conditions. Thus, various modifications of the embodiments of the disclosure, in addition to those shown and described herein, will be apparent to those skilled in the art from the foregoing description. Such modifications are also intended to fall within the scope of the appended claims.

Example 1

The reagents shown in Table 4 were combined to form a solid composition of benzyl oxide and SXS. The inclusion of the SXS as a carrier formed a flowable solid with the SXS remaining as an inert carrier.

TABLE 4

| Name | Liquid | Solid Composition (Calculated) |
|---|---|---|
| SXS, 40% | 50 | 39 |
| NaOH, 50% | 37.5 | |
| Benzyl Alcohol | 12.5 | |
| Benzyloxide | | 61 |

Example of forming the sodium benzyl oxide without the SXS did not provide flowable solids, instead paste like compositions were formed.

Example 2

The solid composition of Table 4 was used to make exemplary solid cleaning compositions as shown in Table 5 with various acids. The stability evaluation was completed at about 40° C. with 65% relative humidity and also at 50° C. without humidity. The high humidity conditions were more challenging for producing stable solids than the increased temperature of 50° C.

exhibited a light amber color. After approximately 10 minutes of cooking the oil begins to polymerize and thicken and smoke evolves from the oil. The pan should be rotated to ensure panels are evenly heated in oven. The panels are then allowed to cool overnight before testing with cleaning/degreasing formulations.

A solid composition of the sodium benzyl oxide (granulate) was diluted as a 15% and a 10% use solution and each pH adjusted with sulfuric acid. The formulations were tested according to application and soil removal from the corn oil panels described above in comparison to a commercial control formulation (liquid caustic-free solvent-based ready to use (RTU) composition of benzyl alcohol, linear alkyl benzene sulfonate, 2-(2-Aminoethoxy)ethanol and monoethanolamine). Three drops of each formulation are added down the column of the coupon, each drop representing the contact time with the soil (30, 60, 120 seconds). At each time point, the chemistry was wiped away. The coupons were dried and qualitatively assessed penetration of polymerized corn comparing all formulations. Visual observations were made and images were also taken to quantify the amount of oil removed using FUJI analysis.

TABLE 5

| | Composition 1 | Composition 2 | Composition 3 | Composition 4 | Composition 5 | Composition 6 | Composition 7 | Composition 8 |
|---|---|---|---|---|---|---|---|---|
| Solid Composition | 60 | 60 | 60 | 60 | 60 | 60 | 60 | 60 |
| Sulfamic | 40 | | | | | | | |
| Citric Acid Anhyd | | 40 | | | | | | |
| sodium bisulfate | | | 40 | | | | | |
| Adipic | | | | 40 | | | | |
| Acid EDTA | | | | | 40 | | | |
| Succinic | | | | | | 40 | | |
| Tartaric | | | | | | | 40 | |
| Glutamic | | | | | | | | 40 |
| Observations | Unstable | Unstable | Unstable | Tablet and powder not stable | Stable powder, tablet not stable | Tablet and powder not stable | Tablet and powder not stable | Tablet acceptable, powder stable |

The observations of the various cleaning compositions made with the solid composition of Table 4 show the solid compositions made with a non-hygroscopic solid acid provide the most stable solids. Without being limited to a particular mechanism of action, the more hygroscopic acids attract water and further react with remaining caustic in the solid composition resulting in a less stable composition or in evaluated embodiments unstable compositions. Moreover, the -hygroscopic solid acids also beneficially reduce the pH to provide non-PPE solid compositions. The evaluated Acid EDTA and glutamic acid provide these results of lower pH for non-PPE applications while also providing stable powders.

Example 3

Corn oil panels were prepared to evaluate degreaser performance on polymerized corn oil panels and how quickly formulations penetrate the soiled surface.

Preparation of polymerized Corn Oil Panels. Corn oil soils were prepared onto 3×5 inch stainless steel panels by lightly coating corn oil using a 2 inch polyurethane brush. The panels were coated to ensure no streaks of bare steel remained and any excess oil was removed using only the weight of the brush. Panels were then placed on an aluminum tray and cooked in a 375° F. oven for approximately 20 minutes until the polymerized oil was no longer tacky and The results are summarized in FIG. 1 where the solid compositions of the sodium benzyl oxide (granulate) at a use solution pH that do not require PPE (tested at pH 10.5-11) provided substantially similar (and in some instances improved) cleaning performance over the control having a more alkaline pH requesting PPE. Cleaning performance is shown according to mean value from image analysis analyzing area on the coupons with remaining soils and using imagine analysis to extrapolate removal of soils or cleaning efficacy. The lower the mean value is indicative of improved soil removal.

Although the performance improves with increase in pH and concentration, at the pH of 10.5-11 the evaluated sodium benzyl oxide beneficially removed polymerized soil that was equivalent to the Control RTU after 60 seconds and 2 minutes while providing benefits of the lower pH use conditions.

Example 4

Compositions having molar ratio of benzyl alcohol to sodium hydroxide of 1:1, 1:2, and 1:4 did not form stable solids. Instead a paste was made at these different mole ratios of benzyl alcohol to sodium hydroxide. Only with the addition of the sulfonate carrier was a stable solid provided, at even a 1:1 molar ratio of benzyl alcohol to sodium hydroxide.

An exemplary calculation of the molar ratio of sodium benzyl alcohol to sodium hydroxide is shown in the following Tables.

TABLE 6

| | |
|---|---|
| Mass Benzyl oxide | 5.23 |
| DI water Volume | 100.39 |
| pH before | 13.67 |
| ml of 1M HCl 1:1 reaction of HCL to NaOH | 33 |
| pH after titration | 7 |
| Excess moles of NaOH | 0.033 |
| NaOH g in benzyl oxide sample | 1.3199 |
| wt % excess in sample | 25.24 |
| MW of sod benzyl oxide | 69.98 |
| MW of NaOH | 39.997 |
| MW of SXS | 208.21 |

TABLE 7

| | Composition 1 before drying | Composition 1after drying | Moles of component | Mole ratio |
|---|---|---|---|---|
| SXS, 40% | 50 | | | |
| SXS, dried | | 39 | 0.187 | |
| NaOH, 50% | 37.5 | | | |
| NaOH, dried | | 25.24 | 0.631 | |
| Benzyl alcohol | 12.5 | | | 1.235 |
| sod benzyl oxide | | 35.76 | 0.511 | |
| Total | 100 | 100 | | |

Example 5

Additional testing to evaluate stability of the solids was undertaken. Dimensional stability for solids that are tablets is often undertaken using qualitative assessments, for example to ensure that the tablets do not swell, crumble or otherwise disintegrate in shape. For powder or granulate solids, the dimensionally stability is qualitatively assessed to ensure the solid remains flowable and does not clump or discolor. This is distinct from quantitative assessments of dimensional stability for larger solid blocks, wherein the change in dimension (e.g. height, width) is measured over time to calculate a % change in dimension. The additional testing conducted was completed on powder and tablet solids made from the powders and therefore used the qualitative assessments.

An initial testing was conducted comparing Compositions 1, 2 and 3 (see Table 5) where tablets were placed in a plastic cup and left exposed to high temperature and humidity (40° C./65% humidity) as well as high temperature (50° C. with ambient humidity under 55%) conditions for up to 5 days for observation. The tests confirmed that some swelling and disintegration of the Compositions were observed, with less significant stability impact observed for Compositions 2 and 3.

The results of the plastic cup testing were continued by testing a broader range of compositions while also placing the tablets into a foil packet to provide additional protection from the temperature/humidity conditions and the test was continued for 8 weeks as further indicative of storage and transport conditions (in comparison to the plastic cup test) for unit dose packaged solid compositions. Summary of the test compositions and observations over time are described herein:

Composition 3 was evaluated over 8 weeks. No substantial change in tablet stability or condition was detected in either high temp/humidity or high temp foil packets until 4 weeks.

Composition 3 using granulate sodium benzyloxide (instead of powder) was evaluated over 8 weeks. No substantial change in tablet stability or condition was detected in either high temp/humidity or high temp foil packets until 2 weeks, at which point the high temp foil tablet demonstrated some disintegration whereas the high temp/humidity packet did not demonstrate disintegration until about 6 weeks.

Composition 4 in powder form was evaluated over 8 weeks and some clumping was detected in both high temp/humidity and high temp foil packets at 2 weeks, demonstrating that adipic acid alone was not sufficient for stabilizing the benzyl oxide solid.

Composition 4 was evaluated over 8 weeks and swelling was detected in both high temp/humidity and high temp foil packets at 1 week, demonstrating that adipic acid alone was not sufficient for stabilizing the benzyl oxide solid.

Composition 5 was evaluated over 8 weeks in both a powder package as well as a solid tablet. The powder stays flowable over the 8 weeks and the tablet does not significantly swell.

Composition 6 was evaluated over 8 weeks with tablets. No substantial change in tablet stability or condition was detected in either high temp/humidity or high temp foil packets until 6 weeks. However the slight disintegration or swell up to 8 weeks still indicated a passing evaluation for stability.

Composition 6 in powder form was also evaluated over 8 weeks. Some clumping of the powder in the high temp foil packets was observed at 2 weeks and beyond.

Composition 7 was evaluated over 8 weeks with tablets. Some swelling was detected in high temp foil packets at 2 weeks, and swelling in the demonstrating that tartic acid alone was not sufficient for stabilizing the benzyl oxide solid.

Composition 7 was evaluated over 8 weeks with powder form in the foil packets as well. Some clumping of the powder in the high temp foil packets was observed at 2 weeks and beyond as well as at high temp/humidity at 4 weeks and beyond.

Composition 8 was evaluated over 8 weeks with tablets and powered. No substantial change in tablet stability or condition, as well as powder flowable, was detected in either high temp/humidity or high temp foil packets over the 8 weeks demonstrating an enhanced stabilizing effect of glutamic acid.

It is to be understood that while the invention has been described in conjunction with the detailed description thereof, the foregoing description is intended to illustrate, and not limit the scope of the invention, which is defined by the scope of the appended claims. Other embodiments, advantages, and modifications are within the scope of the following claims. Any reference to accompanying drawings which form a part hereof, are shown, by way of illustration only. It is understood that other embodiments may be utilized and structural changes may be made without departing from the scope of the present disclosure. All publications discussed and/or referenced herein are incorporated herein in their entirety.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A solid composition comprising:

an alkali metal benzyl oxide;

a sulfonate carrier; and a non-hygroscopic solid acid;

wherein the solid is tablet, block, powder or granulate, wherein the solid is a dimensionally stable solid or a flowable solid, and wherein the solid does not require personal protective equipment (PPE) for handling.

2. The solid composition of claim 1, wherein the alkali metal benzyl oxide comprises sodium benzyl oxide.

3. The solid composition of claim 1, wherein the sulfonate carrier is a short chain alkyl benzene or alkyl naphthalene hydrotrope.

4. The solid composition of claim 1, wherein the sulfonate carrier comprises one or more of sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butyl naphthalene sulfonate.

5. The solid composition of claim 1, wherein the non-hygroscopic solid acid is an acid EDTA and/or glutamic acid, and optionally wherein the non-hygroscopic solid acid is acid is further combined with an additional solid acid.

6. The solid composition of claim 5, wherein the additional solid acid is an additional non-hygroscopic solid acid.

7. The solid composition of claim 1, wherein at least one of the following is true:

(a) the alkali metal benzyl oxide comprises from about 10-60 wt-% of the composition, the sulfonate carrier comprises from about 5-40 wt-% of the composition, and the non-hygroscopic solid acid comprises from about 20-60 wt-% of the composition;

(b) the alkali metal benzyl oxide comprises from about 20-50 wt-% of the composition, the sulfonate carrier comprises from about 10-30 wt-% of the composition, and the non-hygroscopic solid acid comprises from about 25-50 wt-% of the composition;

(c) the alkali metal benzyl oxide and the sulfonate carrier are provided in a premix comprising from about 40-80 wt-% of the composition, and the non-hygroscopic solid acid comprises from about 20-60 wt-% of the composition; or (d) the alkali metal benzyl oxide and the sulfonate carrier are provided in a premix comprising from about 50-70 wt-% of the composition, and the non-hygroscopic solid acid comprises from about 30-50 wt-% of the composition.

8. The solid composition of claim 1, wherein the solid consists of the alkali metal benzyl oxide, optionally alkali metal hydroxide, the sulfonate carrier and the non-hygroscopic solid acid and is substantially free of water, or free of water.

9. The solid composition of claim 1, further comprising at least one additional functional ingredient suitable for a solid cleaning and/or degreasing composition.

10. A method of making the solid composition of claim 1 comprising:

combining a premix comprising an alkali metal benzyl oxide and a sulfonate carrier with a non-hygroscopic solid acid, wherein the solid is tablet, block, powder, or granulate and wherein the solid is a dimensionally stable solid or a flowable solid.

11. The method of claim 10, further comprising a spray drying step and/or granulation step.

12. A method of using a solid cleaning composition comprising:

generating a use solution of the cleaning composition according to claim 1 or the composition made by the method of claim 10; and contacting a surface or article in need of cleaning, degreasing and/or stripping with the use solution; and removing soils from the surface, wherein the use solution pH is from about 8 to less than about 11 for non-personal protective equipment (PPE) applications.

13. The method of claim 12, wherein the surface is a hard surface or article soiled with a polymerized fat soil.

14. The method of claim 12, wherein the dilution range of the use solution is from about 5-20%, or about 10-15%.

15. The method of claim 12, wherein the contacting of the surface is for an amount of time from about one second to about 24 hours, or from about one minute to about 2 hours.

16. The method of claim 12, wherein no additional mechanical force is required for removal of the soil.

* * * * *